Oct. 24, 1967   E. H. GREEN   3,348,743
AEROSOL VALVE CONSTRUCTION
Filed Dec. 23, 1965   2 Sheets-Sheet 1
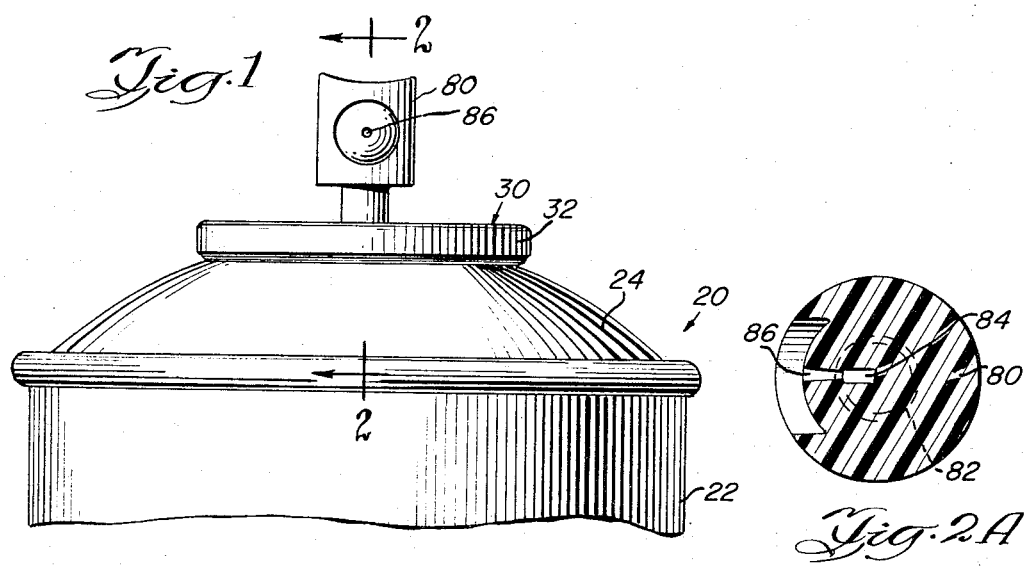
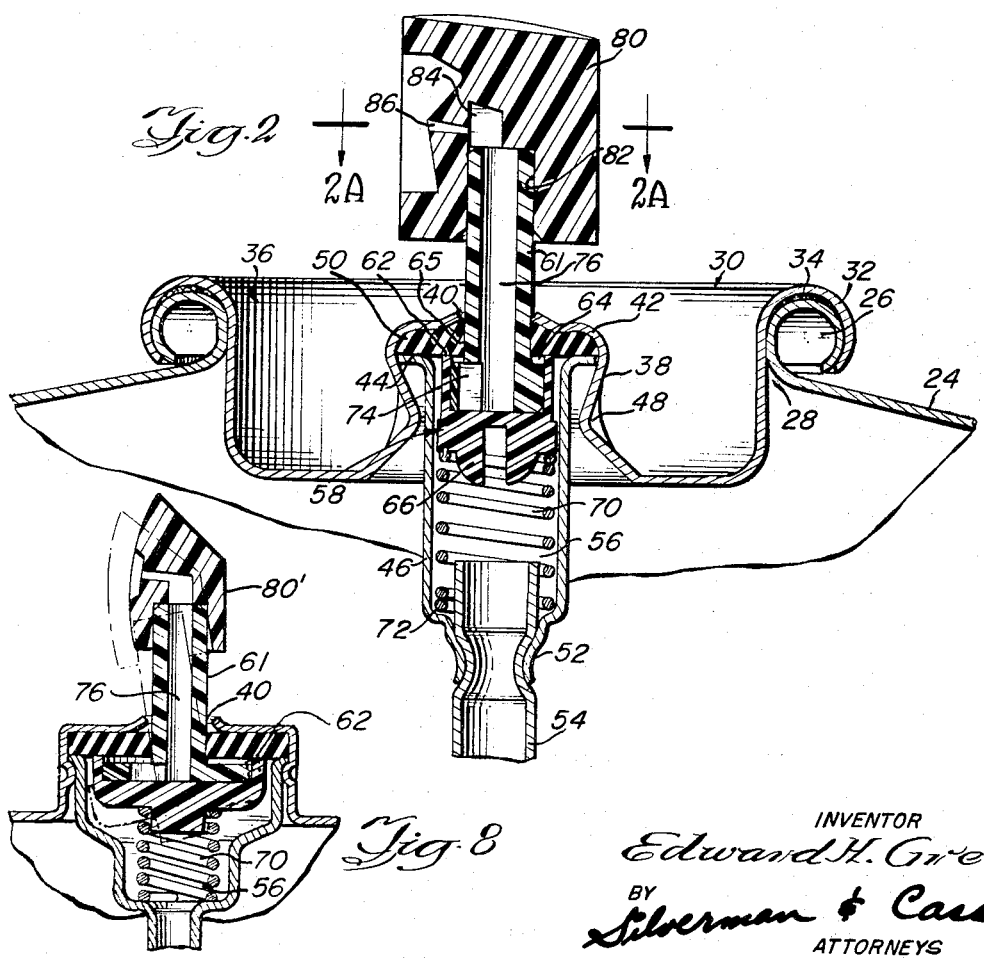
INVENTOR
Edward H. Green
BY
Silverman & Cass
ATTORNEYS

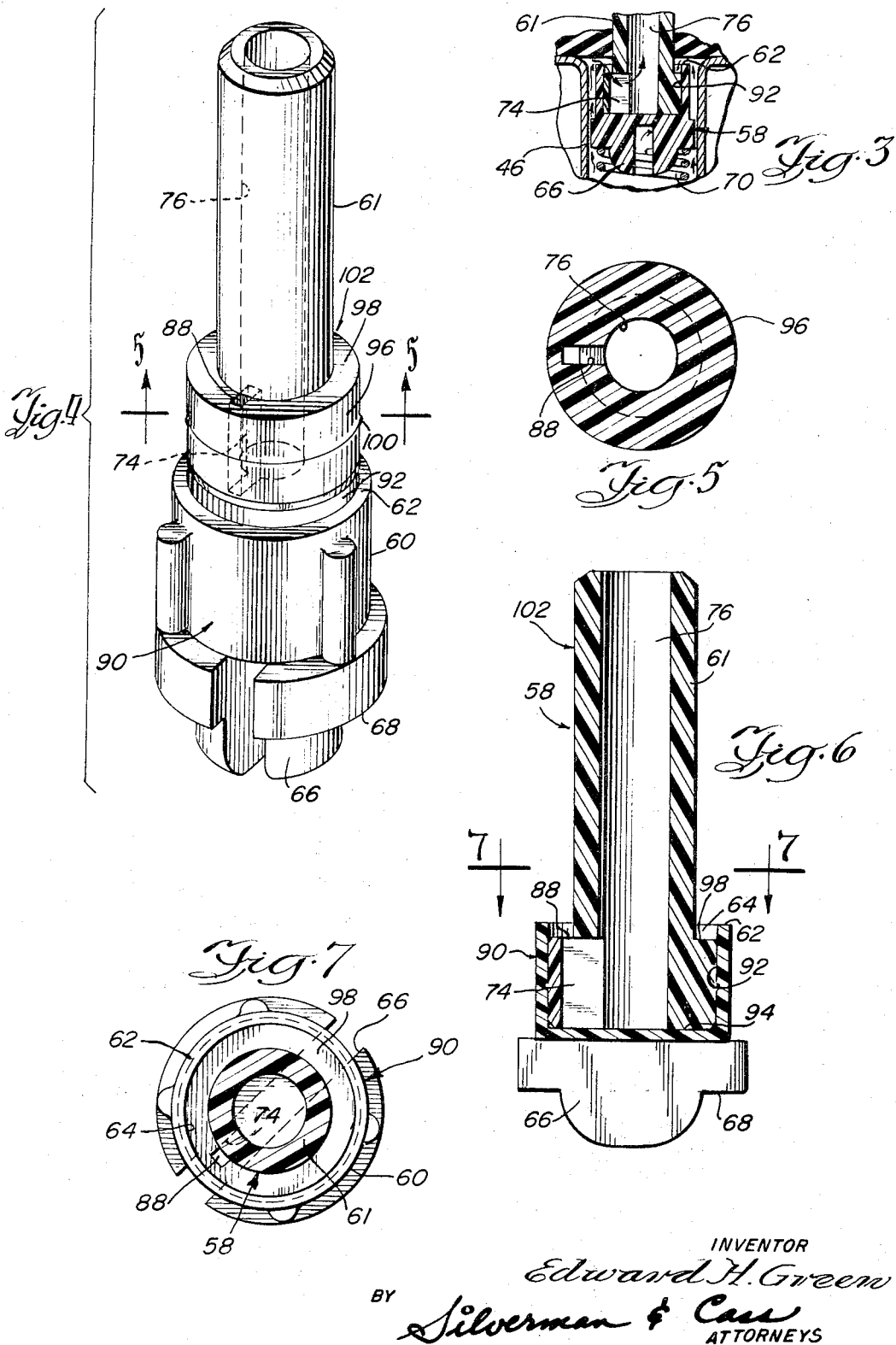

United States Patent Office 3,348,743
Patented Oct. 24, 1967

3,348,743
AEROSOL VALVE CONSTRUCTION
Edward H. Green, 11 Army Trail Road,
Addison, Ill. 60101
Filed Dec. 23, 1965, Ser. No. 515,944
10 Claims. (Cl. 222—402.24)

ABSTRACT OF THE DISCLOSURE

An aerosol spray valve of the type which utilizes an integral valve plunger and stem assembly. The assembly is mounted within an aerosol container under the influence of a biasing means, with the valve plunger sealingly engaged against a gasket member to prevent escape of the aerosol product, and the stem portion of the assembly protruding from the cannister and adapted to be fitted with a spray head. The integral valve plunger and stem assembly is formed from a socketed cup member and a hollow-bored stem part which is closely received in the socketed portion of said cup member to close off the lower end of the stem bore; the stem being provided with a metering aperture and a drain slot to permit trouble free dispensing of the aerosol product.

---

This invention relates generally to aerosol valves and more particularly is concerned with a novel valve construction for a pressurized package in which there is a stem protruding from the package and upon which a spray head or push-button is adapted to be mounted.

This application is an improvement over my co-pending application Ser. No. 403,469, filed Oct. 13, 1964 and entitled, "Spray Valve With Protruding Stem," now Patent No. 3,266,678.

The so-called aerosol package of today is a canister or bottle of robust construction capable of sustaining relatively high internal pressures, having some material therein which is to be atomized or sprayed, this material being suspended in or mixed with a propellant. The propellant is usually a gas under pressure, such as for example, gases having low boiling points. The canister is provided with an opening in its top and a valve assembly is mounted in this opening, usually by crimping the same in place. The valve assembly consists of a metal cover member having a central boss protruding from an annular well, a housing formed on the interior of the boss and connected to a dip tube which has communication with the interior of the housing and extends down to the bottom of the canister. The housing has a gasket of resilient material clamped to its upper wall, and a central hole in the gasket aligns with a hole in the top wall of the boss. The side walls of the housing are crimped in position and they terminate in an upper flange which sandwiches the gasket to the top of the boss, thereby forming the top wall of the housing and holding the gasket in place.

Within the housing there is a plunger which is spring pressed against the bottom surface, the upper end of the plunger serving as a valve seat and cooperating with the gasket to prevent the issuance of pressurized material from the canister unless the plunger is manually pushed away from the gasket.

For purposes of explaining the nature of this invention, reference may be had to several structures which are known, and likewise several patents whose disclosures may be referred to. Reference also will be had to the disclosure of the co-pending application above mentioned.

Commercially available valves in use principally today include two general types. The first type may be referred to as a stem valve, and the second type may be referred to as the slot type.

In the case of the stem valve, the plunger which is referred to above includes an integral hollow stem which protrudes through the gasket and the hole in the boss. The stem is hollow and there is a push-button or spray head that has a socket in its bottom end which is mounted on the stem end. An external metering orifice in the side of the spray head communicates with the socket so that any material that emerges up the hollow stem will be sprayed from the external metering orifice.

Continuing with the discussion of the stem valve, the hollow stem provides a central bore which has a blind end, usually at about the level of the valve seat or slightly above. The side wall of the stem which is at the same axial position as the gasket has a lateral internal metering orifice which opens to the bore. When the plunger is tightly engaged against the bottom of the gasket, the internal metering orifice is blocked by the gasket. When the spray head is pushed down, that is the stem is moved axially inward of the boss, the internal metering orifice is carried inside of the housing past the surface of the gasket. At this point it communicates with the interior of the housing which has been filled with the pressurized material by the propellant by way of the dip tube, and hence the pressurized material will be driven into the bore, out the stem end, into the spray head and out of the external metering orifice.

The actual metering is normally done at the internal metering orifice since it is intended that there be expansion of the propellant gas in the bore while the material is on its way out of the package.

Examples of this kind of valve are shown in U.S. Patents 3,114,483 and 2,822,960. In the latter structure the blind end is below the valve seat.

The second kind of valve mentioned is the so-called slot valve. This type of valve uses a valve plunger which has a hollow socket opening to the inner surface of the gasket. The socket is coxial with the holes in the gasket and the boss. The spray head in this type of valve has an integral depending stem. The stem is hollow and its upper end communicates with an external orifice in the enlarged head. The bottom end is chamfered so that it can be pushed into the boss from the exterior thereof, and will pass into the socket through the gasket, seating in the socket of the valve plunger. This engagement is relatively tight. The engagement with the gasket is such that there must be a seal while permitting the introduction and removal of the stem.

At the bottom end of the stem there is a slot in the side wall. This slot extends from a point which may be within the confines of the gasket when the stem is seated, down to the free end of the stem. In this case, the upper end of the plunger engages flatly against the inner surface of the gasket and the upper end of the slot opens above the level of engagement. When the spray head is pressed, it pushes the stem inward and moves the valve seat of the plunger off the surface of the gasket. The upper end of the slot which extends above the plunger is now exposed to the interior of the housing below the gasket. Pressurized material may now enter and pass into the bore of the stem of the spray head and out the external orifice.

The construction and operation of this valve are disclosed and claimed in U.S. Patent 2,777,735.

In another form of the slot valve, instead of having the upper end of the plunger flat against the gasket, there is a gallery formed in the plunger, which is recessed below the valve seat. In this case, instead of extending above the level of the valve seat, the upper end of the slot need only open into the gallery. This form of valve structure has been found to give better control because the cut-off and start of spraying are more positive than with the valve structure in which the slot end extends into the gasket.

The details of a slot valve with the gallery structure are disclosed in U.S. patent application, Ser. No. 298,946, now Patent No. 3,233,792.

Each of the above described valves, that is the stem valve and the slot valve has its own particular advantages and disadvantages which are set forth in the said co-pending application, Ser. No. 403,469, for the most part, but which may conveniently be enumerated hereinafter.

The stem valve is a more economical valve. It is more easily assembled because the protruding stem pilots the valve parts during assembly coaxially of the housing and the boss. The spray head is smaller, simpler to make and easier to install.

The spray head of the slot valve has the integral stem and the complex passageway system in order to connect the external metering orifice with the hollow bore in the stem. The internal parts of the valve have to be perfectly aligned with the holes in the gasket and in the boss and this presents problems in manufacture and assembly. When the filler installs the spray heads he is required accurately to insert the stem end into the hole in the boss, which is not as easily done as pushing a small spray head with a tapered pilot hole onto the end of a protruding stem.

The stem type valve lends itself readily to the tilting type of valve which is a useful form. The slot type valve as known does not readily adapt to this kind of operation.

The slot type valve can dispense any kind of material that can be dispensed by a stem type valve, but additionally it is capable of dispensing suspensions which cannot be handled by stem type valves. Waxes, starches and especially paints consist of suspensions of fine particles in some vehicle, and this material leaves deposits and residues on the interior parts of a valve after use. These accumulate and clog the fine passageways. In the stem type valve, the residue which adheres to the inside of the walls of the bore builds up at the bottom until the orifice is blocked, and/or the orifice itself quickly fills and blocks. Just a few minutes in the case of some of the quick drying material is enough to produce a blockage which is incapable of being relieved.

The slot type valve, on the other hand, enables the residue to accumulate at the bottom end of the bore and the bottom end of the slot, without affecting the upper end of the slot. Since the metering is done only at the upper end of the slot, the accumulation at the bottom of the slot is of no consequence. Even if there is clogging, the spray head and stem may be rotated relative to the plunger to free the passageway, or the entire spray head and stem may be removed and the slot cleaned. This latter process is not capable of being done with the stem type valve since the metering orifice is permanently installed in an inaccessible location. Obviously the metering in the slot type valve may be changed at will by merely changing to a different spray head.

The co-pending application discloses and claims a novel structure in which a stem valve is equipped with a slot, so that all of the advantages and benefits of the stem valve, together with the most important advantages of the slot type valve are achieved, and likewise an important object of the invention herein is to achieve these benefits and advantages.

The structure which accomplishes the above advantages in the co-pending application is one in which there is a combined valve plunger and substantially permanently attached stem, with the plunger on the interior of the cover member of the structure and the stem protruding from the cover member just as in the case of the usual stem valve. This structure is a characteristic of the invention herein as well. In the structure of the co-pending application, the combined stem and valve plunger had a body portion which provided the stem, the valve seat and the slot but had a large opening in its bottom end so that the molding tools needed to form the slot and the hollow bore of the stem could enter from the bottom. This hole was formed as a socket, and in the manufacture of the structure, once the piece comprising the stem and the majority of the plunger had been molded, the hole in the bottom was closed off by means of a plug. This plug was tightly forced into position to seal the opening and thus close off the bottom end of the bore of the stem as well as the bottom end of the slot.

The molding of the stem and body of the valve plunger according to the disclosure of the prior apparatus required the production of a member which was open on both ends. This member had the bottom opening plugged and sealed.

According to the present invention, the structure described is accomplished by using a closed bottom cup member having the external configuration of a conventional valve plunger below the valve seat, so that not only can the tools for a valve already being manufactured be used, but likewise, there is no concern for the possibility of leakage past a plug. In the new structure, the stem and interior of the valve plunger are formed generally in the configuration of a piston having a long coaxial extension, the piston being the insides of the valve plunger and having the slot and stem bore formed therein and the coaxial extension being the stem. The piston is pushed into the open end of the cup member, to a point below the valve seat. It becomes immaterial that there are slight variations in dimension or flash on the bottom of the stem member, as it will be called, since the slot dimensions are maintained constant and cannot be varied when the stem member is pushed home. Furthermore, if the slot is fully below the valve seat as preferred, it will be immaterial how far below the seat it is. A gallery can be formed without the need for special tools, since the depth of the larger portion of the stem member need only be made less than the depth of the interior of the cup member.

In the said co-pending application, one form of the invention relates to a structure in which the slot which is formed in the plunger has its only opening in a plane which is parallel with the plane of the valve seat, and hence in the floor of a gallery which is formed between the juncture of the stem with the body portion of the plunger and the valve seat. The remainder of the slot extends below the floor of the gallery and likewise an interior portion of the slot is below the wall of the stem at that point. The invention herein is especially intended for use with this type of structure.

An important object of the invention, if not inferred from the above recitation is to form a gallery without the need for special tools and molds, merely by bringing the cup member and stem member together.

Many other objects will occur to those skilled in this art as a detailed specification of preferred embodiments of the invention are set forth in connection with the accompanying drawings.

In the said drawings:

FIG. 1 is a fragmentary side elevational view of a pressurized package showing the environment in which the valve structure of the invention may be used.

FIG. 2 is a median fragmentary sectional view taken generally along the line 2—2 of FIG. 1 and in the direction indicated, the valve being closed.

FIG. 2a is a transverse sectional view taken through the sprayhead of FIG. 2 and in the direction indicated.

FIG. 3 is a view similar to that of FIG. 2 but showing the valve in opened condition for dispensing pressurized materials.

FIG. 4 is a perspective exploded view of the stem and cup members which form the combined plunger and stem.

FIG. 5 is a sectional view taken generally along the line 5—5 of FIG. 4 and in the direction indicated.

FIG. 6 is a median sectional view of the combined valve plunger and stem but shown in an assembled condition.

FIG. 7 is a sectional view taken generally along the line 7—7 of FIG. 6 and in the direction indicated.

FIG. 8 is a sectional view similar to that of FIG. 2, but of a modified form of the invention, illustrating how a structure of this type may be adapted for use with a tilting stem.

Generally the invention is characterized by the provision of an integral valve plunger and protruding stem in which there is a slot formed during the molding thereof so that the benefits of the well-known slotted type valve may be obtained. Specifically the invention herein is characterized by the provision of an integral valve plunger and stem in which the exterior configuration of the valve plunger below the valve seat and including the bottom end thereof is molded as a cup shaped member opening to the top thereof, and the stem and the complete interior of the plunger including the hollow bore of the stem and the connecting slot is molded as a single unit, the two pieces being assembled by pushing the stem member into the cup member, and forming a gallery at the same time.

Referring now to the drawings, FIG. 1 illustrates the upper end of the pressurized package designated generally by the reference character 20 and comprising a cylindrical canister 22 having an upper dome 24 terminating in a curled lip 26 thereby providing an open top 28 which is closed by the cover member 30 that mounts the valve mechanism.

The cover member 30 comprises a sheet metal cuplike structure having an upper curled lip 32 adapted to be crimped over the lip 26 and sealed by means of suitable gasketing material 34 provided in the lip 32 by the valve manufacturer. The cover member has a well 36 in the center of which there is an integral upstanding generally cylindrical boss 38 having a central opening 40 in its top wall 42. The boss 38 is crimped to the outwardly flared upper end 44 of the valve housing 46 that depends from the interior of the boss 38, the crimps being shown at 48.

The housing 46 is sealed on its top end by means of a rubber-like gasket 50 sandwiched between the top wall 42 of the boss 48 and the flared upper end 44 of the housing 46.

The bottom end of the housing is pinched as at 52 to the upper end of the flexible dip tube 54 which extends downwardly to a corner of the canister 22 so that the pressurized material may flow up the dip tube and into the chamber 56 formed on the interior of the housing.

A valve plunger designated generally 58 is disposed within the chamber 56, the plunger 58 being best shown in FIGS. 4 through 7. Although the plunger is an integral structure, it is actually made up of two parts in a manner to be discussed below.

The plunger consists of an enlarged generally cylindrical body portion 60 which is always contained within the housing 46 and an integral protruding hollow stem 61 that extends through a suitable opening 65 provided in the gasket 50 and through the opening 40 in the wall 42. The gasket 50 is normally in the shape of a flat annular disc when installed but assumes the general configuration shown somewhat as in FIG. 2 during the assembly of the valve mechanism.

It will be seen that the stem 61 is slidably and sealingly engaged within the opening 65 of the gasket 50.

Continuing with the description of the valve plunger 58, at its upper end, the body portion 60 has an annular valve seat 62, this valve seat being spaced from the stem 61 by an annular gallery 64 whose purpose will be described. The bottom end of the body portion 60 is of reduced diameter as shown at 66 to provide a shoulder 68 for seating a helical spring 70 disposed in the chamber 56 and having its bottom end engaged at 72. The spring urges the plunger 58 upward so that seat 62 normally is biased tightly to engage against the bottom surface of the gasket 50. The pressurized material cannot escape from the chamber 56 while the plunger is in this position.

An internal slot is formed in the extension or piston portion 96 of the stem 61 at 74, the slot communicating between the gallery 64 and the bore 76 of the hollow stem. If the stem 61 is pushed downwardly to unseat valve seat 62 from the gasket 50, the condition will be as illustrated in FIG. 3. Pressurized material will follow the path taken by the arrows into the gallery 64 through the slot 74 and out through the bore 76. A suitable push button 80 which may be molded as a unitary member of plastic has a socket 82 to fit the upper end of the stem 61, the socket communicating with a small passageway 84 that leads to the external orifice 86. The pressurized material will be sprayed out of the orifice 86 when the push button 80 is depressed. If desired, external metering or mechanical break-up of the emerging material may be controlled by a suitable insert in the spray head, in a manner well-known in this art.

The only portion of the slot 74 which meters material passing through the slot will be the upper end 88 and by controlling the cross-sectional areas of this portion of the slot the manufacturer may control the rate of flow.

The use of the structure in which there is a gallery is advantageous since the moment that the slightest unseating occurs there will be a large area over which the material may enter the gallery and pass through the upper end 88 of the slot 74. The slot 74 is advantageous since at the spraying of heavy material these materials will tend to continuously drain down to the bottom end of the slot thereby leaving the upper end clean.

As seen in FIG. 4, the valve plunger 58 is actually made up of two parts. The cylindrical body portion 60, the valve seat 62, the lower reduced diameter spring seat 66 and the entire exterior configuration below the valve seat 62 is molded as a single cup member which may be designated 90. The interior of the cup member provides a simple cylindrical socket 92 opening to the top of the member as viewed in the drawings and having a flat imperforate bottom 94. Preferably the wall thickness is the same as the radial thickness of the valve seat 62. It will be recognized by those skilled in this art that the bottom exterior configuration of the cup member 90 is practically identical to that of a conventional slot type valve which has been marketed for some time. Indeed, the same tools may be modified to mold this cup member.

The stem 61 of the integral structure which is illustrated in FIG. 6 is integral with a cylindrical piston formation 96. This piston formation 96 is of the identical diameter as the inside of the cup formation 92, and of an axial length slightly less. By virtue of this arrangement, when the piston formation 96 is forced into the socket 92 all the way, its bottom end will engage against the flat bottom 94 and its upper surface 98 will become the floor of the gallery 64. A small ridge 100 may be molded into the outer surface of the piston formation 96 to bite into the inner surface of the wall of the cup member 90 to provide a substantially permanent attachment.

It will be noted that the slot 74 and the bore 76 of the stem member 102, it may be called, are quite readily molded by inserting suitable tools from the bottom of the stem member 102 during the molding of the member. The size of the molding pin which produces the slot 74 may be varied to change the metering. The metering is controlled by the opening 88 which is at the level of the floor 98. The advantages of surface to surface engagement of molding tools which has been described in the co-pending application apply here as well. The molding tool surface which produces the floor 98 will come flat against the molding pin surface producing the upper limit of the slot 74 at the parting defining the opening 88. The possibility of variation in dimensions is a minimum. If a portion of the slot were intended to be formed in the wall of the stem 61 above the floor 98, there would be a parting line in which molding surfaces move relative to one another in the same plane. This gives rise to a likelihood of flash and dimension variation.

The lower edge of the piston formation 96 preferably will be rounded or chamfered to pilot movement into the socket 92, and where dimensions permit, there may be a taper at the valve seat 62. If the cylindrical piston formation 96 does not seat all the way, it is of no consequence, since the metering will not be affected. The only thing that will happen is that the gallery 64 will be shallower but without affecting function.

In FIG. 8 a modified form of the invention uses a much larger cup member 90 so that the other parts are cooperatingly different in dimension. The spray head in this case is designated 80′ since it is of somewhat different configuration to promote tilting during use thereof. The opening 40 should be of cooperating size to permit this. In all other respects the structures are identical.

It will be appreciated that the structures which are illustrated and described in the co-pending application can be made using the same arrangement as described herein. The cup member need not be deeper than the piston portion 96, if it is desired to use the type of slot which extends above the valve seat. As a matter of fact, the bottom end of the stem member 102 may be of the same diameter as the lower end so that in effect, the cup socket receives the lower end of the stem itself in tight engagement, and the slot 74 has no portion other than that which is molded into the stem member itself. The only problem which might arise in such a case is the difficulty of pressing the stem member into the cup member tight enough to assure a substantially permanent engagement without collapsing the slot, at least to some extent. As stated, it is preferred to have the structure which is illustrated herein.

Variations are capable of being made without departing from the spirit or scope of the invention as defined in the appended claims.

What it is desired to secure by Letters Patent of the United States is:

1. In a valve structure of the protruding free-ended hollow stem type adapted to be sealed to the open top of a canister and adapted to have a spray button removably mounted on the free stem end so that pushing on the button will produce a valving action and permit pressurized products in the canister to emerge and be dispensed and said valve structure including a cover member having a central passageway for movement of the stem therethrough, a gasket and valve housing secured to the inside of the cover member, an integral valve plunger and stem assembly having a valve seat thereon and including an enlarged body portion in the interior of the housing substantially permanently connected to said hollow stem and said hollow stem extending axially from said enlarged body portion and out of the cover member, spring means in the housing urging the valve seat against the gasket, the stem having a central bore, and an internal metering orifice communicating from the bottom of the bore to external of the plunger at a location such that when the seat is against the gasket communication between said orifice and the housing is blocked, but when said plunger is moved to unseat the valve pressurized product may flow from said housing past the seat, into said orifice and bore, the invention herein which comprises: the integral plunger and stem assembly being comprised of a cup part and a step part, the cup part having said valve seat formed at its upper rim and presenting a hollow substantially cylindrical blind-end socket coaxially of said rim, and its exterior wall forming the exterior of said body portion, said stem part forming said hollow stem and having an axially elongate slot formed in the bottom end thereof in communication with said bore, said stem part being substantially fixedly engaged within the blind-end socket with the ends of the central bore and slot closed by the cup part and the upper end of the slot exposed in a position such that when the valve seat is engaged against the gasket there will be no communication past the valve seat to said upper end of the slot, but when said valve seat is unseated there will be such communication.

2. The invention as claimed in claim 1 in which the stem part has an enlarged cylindrical piston formation integral with the hollow stem and the slot has its upper end exposed to the upper end of the piston adjacent the juncture of the piston formation and the wall of said hollow stem, and in which the piston formation is that which is engaged in the socket.

3. The invention as claimed in claim 2 in which the piston formation has an axial length less than the depth of the socket and is bottomed in the socket to provide a recessed gallery within the valve seat with the said upper end of the piston forming the floor of said gallery, and said upper end of the slot opens to said gallery below the valve seat.

4. The invention as claimed in claim 2 in which the upper end of the slot has a portion within the wall of the hollow stem and another portion opening only axially to the floor of the gallery.

5. A valve for use with a pressurized package, comprising
(A) a cover member adapted to be installed in said package;
(B) a housing formed in said cover member and enclosed but for a first passageway adapted to communicate with the interior of the package and a second passageway communicating to the exterior of the cover member,
(C) gasket means installed adjacent the second passageway,
(D) a combined valve plunger and stem assembly reciprocable in the housing with the stem protruding through the second passageway, said assembly being biased to press the valve plunger against the gasket means to prevent passage of pressurized material from the housing through the second passageway
 (1) the valve plunger including a cup member having a valve seat on its upper rim and a hollow blind-bottom socket coaxial with the valve seat,
 (2) the stem part having an enlarged coaxial extension on one axial end thereof and a bore extending throughout said stem part, including said extension,
 (3) an axially extending slot in said extension communicating laterally with the bore and opening to said one axial end thereof,
 (4) the said one axial end of said stem part being engaged within the cup member whereby the bottom of said socket in said cup member closes off one end of the stem bore, the other end opening to the exterior of said cover member.

6. A valve as claimed in claim 5, in which the slot extends through the enlarged extension axially and opens to the axial upper end surface of said extension with no other part of the slot exposed.

7. A valve as claimed in claim 6 in which the enlarged extension is of axial length less than the depth of the socket and is engaged in the socket to a depth such that the axial upper surface of said extension cooperates with said cup member to form a gallery coaxial of said valve seat.

8. A valve as claimed in claim 5 in which the enlarged extension is of axial length less than the depth of the socket and is engaged in the socket to a depth such that the axial upper surface of said extension cooperates with said cup member to form a gallery coaxial of said valve seat.

9. A valve for use with a pressurized package, comprising
(A) A cover member adapted to be installed in said package;
(B) a housing formed in said cover member and enclosed but for a first passageway adapted to communicate with the interior of the package and a second passageway communicating to the exterior of the cover member, (C) gasket means installed adjacent the second passageway, (D) an integral assembly comprised of a valve plunger part and a stem part reciprocable in the housing and biased to press the valve plunger against the gasket means to prevent discharge of the pressurized product, and a portion of the stem protruding through the second passageway having the outer end thereof arranged to removably receive a sprayhead, (1) the valve plunger including a cup member having a valve seat on its upper rim and a hollow blind-bottom socket coaxial with the valve seat, (2) the stem part having an extension on the axial end thereof opposite the end protruding through said second passageway, and a bore extending through said stem part including said extension, (3) an axially extending slot in said extension communicating laterally with the bore and opening axially to the end of said stem opposite said protruding end, (4) the axial end of said stem carrying said extension being fixedly engaged within the socketed portion of the cup member whereby the bottom of said socket closes off one end of said bore, the other end opening to the exterior of said cover.

10. A valve as defined in claim 9, wherein said extension of said stem part is of an enlarged diameter and said slot opens to the upper axial surface of said enlarged extension with no other part of said slot exposed.

References Cited

UNITED STATES PATENTS

| | | | |
|---|---|---|---|
| 2,806,739 | 9/1957 | Drell | 239—579 X |
| 2,881,808 | 4/1959 | St. Germain | 222—402.16 X |
| 3,045,877 | 7/1962 | Green | 239—337 X |
| 3,129,893 | 4/1964 | Green | 239—337 X |
| 3,174,694 | 3/1965 | Kitabayashi | 239—573 X |
| 3,206,082 | 9/1965 | Green | 239—573 X |
| 3,209,960 | 10/1965 | Green | 239—573 X |
| 3,233,792 | 2/1966 | Green | 222—492.24 |
| 3,235,140 | 2/1966 | Green | 251—353 |
| 3,266,678 | 8/1966 | Green | 222—402.24 |

RAPHAEL M. LUPO, *Primary Examiner.*